T. M. BOVARD.
DEVICE FOR DETACHING HORSES FROM VEHICLES.
APPLICATION FILED NOV. 4, 1907
912,646.
Patented Feb. 16, 1909.
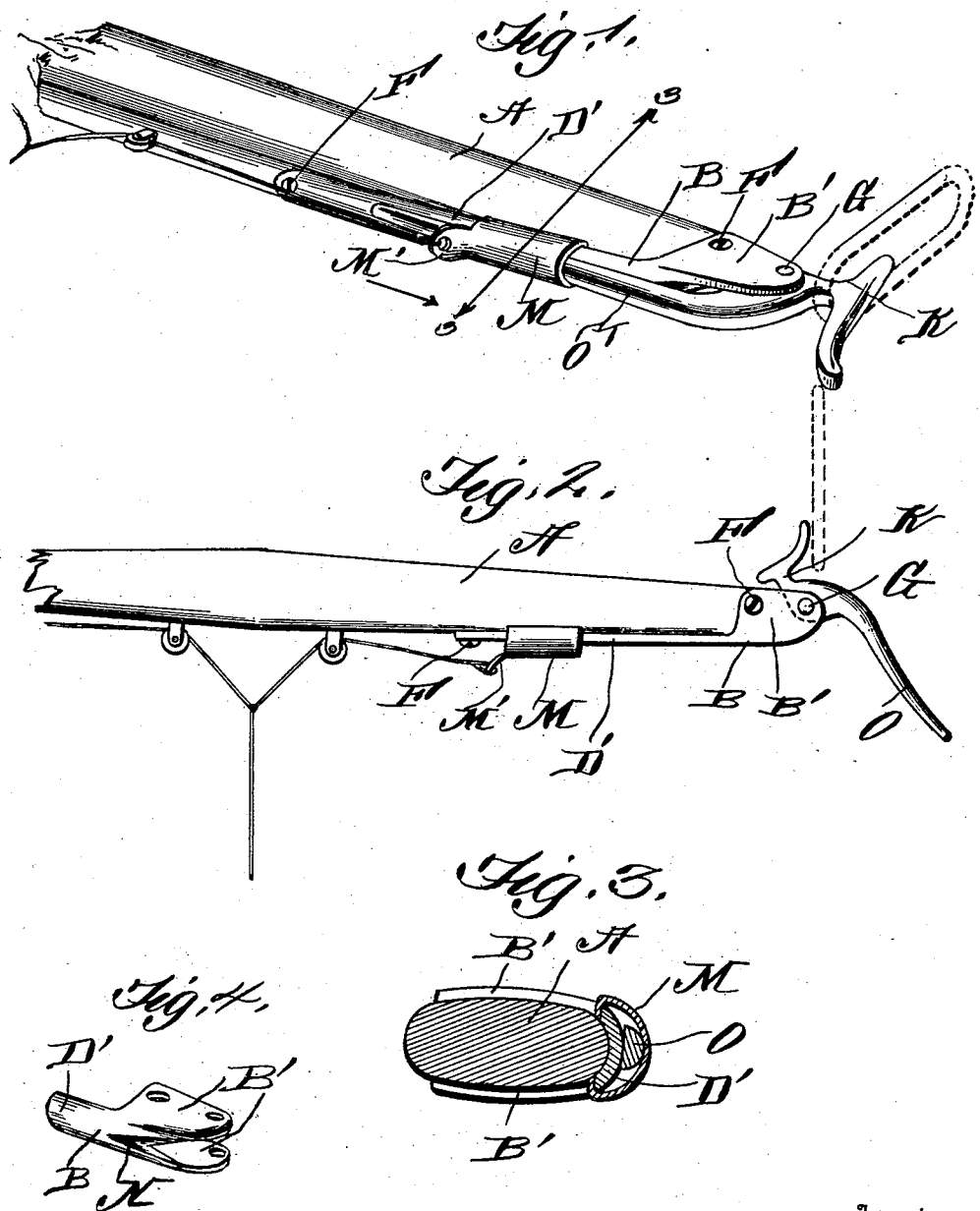

UNITED STATES PATENT OFFICE.

THOMAS M. BOVARD, OF OAKDALE, PENNSYLVANIA.

DEVICE FOR DETACHING HORSES FROM VEHICLES.

No. 912,646.      Specification of Letters Patent.      Patented Feb. 16, 1909.

Application filed November 4, 1907. Serial No. 400,630.

*To all whom it may concern:*

Be it known that I, THOMAS M. BOVARD, a citizen of the United States, residing at Oakdale, in the county of Allegheny and State of Pennsylvania, have invented certain new and useful Improvements in Devices for Detaching Horses from Vehicles; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in devices for detaching horses from vehicles and comprises essentially a metallic clip adapted to fit over the end of a whiffle tree and, in the provision of a pivotal whiffle hook having an elongated arm adapted to be held against the shank of said clip by means of a sliding fastener which may be released from said arm, in case of emergency, to allow the whiffle hook to turn upon its pivot to release a trace, each end of the whiffle tree being equipped with a similar device with chains or cords connected to the releasing means and positioned within convenient reach of an operator in the vehicle to which the device is attached.

The invention comprises various other details of construction and combinations and arrangements of parts which will be hereinafter fully described and then specifically defined in the appended claim.

I illustrate my invention in the accompanying drawings, in which:—

Figure 1 is a perspective view of the invention. Fig. 2 is a plan view showing the hook released. Fig. 3 is a cross sectional view on line 3—3 of Fig. 1, and Fig. 4 is a detail perspective view of a plate which is adapted to hold a pivotal whiffle tree hook.

Reference now being had to the details of the drawings by letter, A designates a whiffle tree adapted to be attached to the running gear of a vehicle in the usual manner, and B is a plate or clip of metal having two wings B' which are adapted to brace the opposite faces of the whiffle tree adjacent to its end and projecting from said ends is a shank portion D' which is concaved upon one side and adapted to conform to the edge of the whiffle tree, and F designates screws passed through said plate and affording means for attachment to the whiffle tree. A pin G is mounted in registering apertures in said wings and upon which the whiffle tree hook K is pivotally mounted. Said whiffle tree hook has a projecting arm O leading therefrom which, when the hook is locked in position to receive and hold a trace hook, is in contact with the outer face of the shank portion of said plate in the manner shown in Fig. 1 of the drawings, a portion of the plate intermediate said wings being recessed or cut away to allow said projecting portion to swing therein.

N designates a groove formed in the convexed surface of the projecting portion of the plate, in which the projection of the whiffle tree hook rests when in contact with the outer face of the shank of said plate.

M designates a retaining member made of a piece of metal, the ends of which are bent to form flanges and engage the opposite marginal edges of the extension of the plate and is adapted to slide over one end of the projection of the whiffle tree hook to hold the same in contact with said plate. One end of the retaining member has an apertured lug M' for the reception of a chain or cord, whereby the same may be pulled toward the center of the whiffle tree and out of contact with the projection of the whiffle tree hook, allowing the latter to turn upon its pivot and release the trace hook.

By the provision of the device as shown and described, it will be observed that a simple and efficient means is afforded which may be readily applied to the ordinary whiffle tree and so arranged that at an instant's notice the trace hooks may be detached to allow a horse to be free from the shaft or thills of the vehicle.

What I claim to be new is:—

A horse detaching device comprising a whiffle tree, a forked plate fastened to the end thereof and having one edge flush with the forward edge of the whiffle tree, the opposite edge of the plate provided with a concaved tapering arm fitting over the rear convexed edge of the whiffle tree, the opposite edges of said arm projecting in opposite directions from the surface of the whiffle tree, a retaining hook pivoted to the forked end of the plate, a movable shell having its opposite longitudinal edges bent toward each other and engaging the projecting edges of said arm, a space intervening between the shell and said arm for the reception of the shank of the retaining hook, as set forth.

In testimony whereof I hereunto affix my signature in presence of two witnesses.

THOMAS M. BOVARD.

Witnesses:
 A. G. ROBB,
 JOHN C. MCEWEN.